United States Patent
Polzer

(10) Patent No.: US 11,478,970 B2
(45) Date of Patent: Oct. 25, 2022

(54) HOUSING COMPONENT FOR A MULTI-SHAFT SCREW MACHINE AND METHOD FOR THE PRODUCTION OF A HOUSING COMPONENT

(71) Applicant: Coperion GmbH, Stuttgart (DE)

(72) Inventor: Karl-Conrad Polzer, Weinstadt (DE)

(73) Assignee: Coperion GmbH, Stuttgart (DE)

( * ) Notice: Subject to any disclaimer, the term of this patent is extended or adjusted under 35 U.S.C. 154(b) by 411 days.

(21) Appl. No.: 16/541,843

(22) Filed: Aug. 15, 2019

(65) Prior Publication Data

US 2020/0055226 A1 Feb. 20, 2020

(30) Foreign Application Priority Data

Aug. 16, 2018 (DE) ..................... 10 2018 213 766.8

(51) Int. Cl.
*B29C 48/68* (2019.01)
*B29C 48/685* (2019.01)
*B29C 48/40* (2019.01)

(52) U.S. Cl.
CPC ............ *B29C 48/682* (2019.02); *B29C 48/40* (2019.02); *B29C 48/6801* (2019.02); *B29C 48/6803* (2019.02); *B29C 48/685* (2019.02); *B29C 48/686* (2019.02)

(58) Field of Classification Search
CPC . B29C 48/682; B29C 48/6801; B29C 48/685; B29C 48/40; B29C 48/6803; B29C 48/68; B29C 48/402; B29C 48/57; B29C 48/686
See application file for complete search history.

(56) References Cited

U.S. PATENT DOCUMENTS

| | | | | |
|---|---|---|---|---|
| 3,010,151 A | * | 11/1961 | Dickinson | ............. B29C 48/682 138/171 |
| 3,268,949 A | * | 8/1966 | Schmidt | ................ B29C 48/682 415/196 |
| 3,696,736 A | * | 10/1972 | Studli | ................. B29C 48/6801 100/146 |
| 3,804,382 A | * | 4/1974 | Pultz | ..................... B29C 48/402 366/84 |
| 4,036,540 A | * | 7/1977 | Seufert | ..................... F04C 2/16 384/282 |

(Continued)

FOREIGN PATENT DOCUMENTS

| | | | | |
|---|---|---|---|---|
| CA | 2418821 A1 | * | 8/2003 | ......... B29C 47/0847 |
| DE | 2426732 B1 | | 8/1975 | |

(Continued)

*Primary Examiner* — Charles Cooley
(74) *Attorney, Agent, or Firm* — McGlew and Tuttle, P.C.

(57) ABSTRACT

A housing component, for the production of a housing of a multi-shaft screw machine, includes a base body, in which at least two bores interpenetrating each other are configured. The bores extend in a conveying direction through the base body and are limited transversely to the conveying direction by an inner wall. The inner wall configures at least one first wall section and at least one second wall section such that the at least one first wall section is harder than the at least one second wall section. The wall sections, for example, are generated by material application. The housing component allows for a reliable wear protection and a positive influence on the material processing.

15 Claims, 10 Drawing Sheets

(56) References Cited

U.S. PATENT DOCUMENTS

| | | | | | |
|---|---|---|---|---|---|
| 5,223,345 | A | * | 6/1993 | Kaiser | B22F 5/007 |
| | | | | | 428/557 |
| 5,352,539 | A | * | 10/1994 | Psiuk | B22F 5/10 |
| | | | | | 428/558 |
| 5,752,770 | A | * | 5/1998 | Kawaguchi | B29B 7/48 |
| | | | | | 366/85 |
| 5,816,699 | A | | 10/1998 | Keith et al. | |
| 7,513,039 | B2 | * | 4/2009 | Zahradnik | B30B 11/224 |
| | | | | | 29/888.06 |
| 2020/0055226 | A1 | * | 2/2020 | Polzer | B29C 48/40 |

FOREIGN PATENT DOCUMENTS

| | | | | | |
|---|---|---|---|---|---|
| DE | 29913316 | U1 | | 10/1999 | |
| EP | 1614502 | A1 | | 1/2006 | |
| FR | 2558767 | A1 | * | 8/1985 | |
| FR | 2632892 | A1 | * | 12/1989 | B30B 11/224 |
| JP | 59215845 | A | * | 12/1984 | B29C 48/6801 |
| JP | 2006167642 | A | * | 6/2006 | B29C 48/6803 |
| JP | 2006167642 | A | | 6/2006 | |

* cited by examiner

ID A, pursuant to 35 U.S.C. 119(a)-(d), the content of which is incorporated herein by reference in its entirety as if fully set forth herein.

HOUSING COMPONENT FOR A MULTI-SHAFT SCREW MACHINE AND METHOD FOR THE PRODUCTION OF A HOUSING COMPONENT

CROSS-REFERENCE TO RELATED APPLICATIONS

This application claims the priority of German Patent Application Serial No. DE 10 2018 213 766.8 filed on Aug. 16, 2018, pursuant to 35 U.S.C. 119(a)-(d), the content of which is incorporated herein by reference in its entirety as if fully set forth herein.

FIELD OF THE INVENTION

The invention relates to a housing component for the production of a housing of a multi-shaft screw machine and to a multi-shaft screw machine comprising at least one housing component of that kind. The invention further relates to a method for the production of a housing component.

BACKGROUND OF THE INVENTION

From U.S. Pat. No. 5,816,699 A, a housing section for a multi-shaft screw machine is known. The housing section comprises an insert, in which two bores are configured, which are interpenetrating each other. The bores, on their entire surface, are limited by a wear and corrosion resistant layer, which is configured on the insert, for example, by hot isotactic pressing or by plasma arc welding.

SUMMARY OF THE INVENTION

An object of the present invention is to create a housing component for the production of a housing of a multi-shaft screw machine, which ensures a simple and reliable wear protection. The housing component, in particular, shall have a positive influence on the material processing in the multi-shaft screw machine, as well.

This object is achieved by a housing component for the production of a housing of a multi-shaft screw machine comprising a base body, at least two bores, which are configured in the base body and are interpenetrating each other, which extend in a conveying direction through the base body, and which are limited transversely to the conveying direction by an inner wall of the base body. Due to the at least one second wall section, which is softer in comparison to the at least one first wall section, the risk of cracks and the growth of cracks in the at least one first wall section is reduced and limited, with the result that damages to the inner wall by crack formation and/or spalling are reduced and in particular avoided.

The at least one first wall section and the at least one second wall section, preferably, are configured such that—from a sectional view—a profiled configuration of the inner wall is allowed for, having a positive influence on the material processing in the multi-shaft screw machine. The inner wall is roughened locally in a targeted manner due to the profile. The at least one first wall section thus has a first radial distance to a central longitudinal axis of the respective bore, whereas the at least one second wall section has a second radial distance to the central longitudinal axis of the respective bore. The first radial distance differs from the second radial distance, with the result that the inner wall is configured in a profiled manner A profile of the inner wall, in particular, can be produced such that the at least one first wall section or the at least one second wall section is configured by application of a material layer, or such that the at least one first wall section and the at least one second wall section are configured by application of material layers of different layer thickness, or such that the at least one first wall section or the at least one second wall section is configured by material removal. The material removal takes place during the production of the housing component, for example mechanically by screwing in grooves, and/or during the operation of the multi-shaft screw machine. If the at least one second wall section is configured such that during the operation of the multi-shaft screw machine, a targeted material removal takes place in the at least one second wall section, the profile of the inner wall is created during the operation of the multi-shaft screw machine. Due to a profiled inner wall, in particular, the fusion behavior and/or the flow rate of the multi-shaft screw machine are influenced in a positive manner.

The at least one first wall section and the at least one second wall section are configured side by side and thus form the inner wall. The at least one first wall section and the at least one second wall section thus are in contact with the material to be processed during the operation of the multi-shaft screw machine. Preferably, the inner wall is configured by a plurality of first wall sections and at least one second wall section or by at least one first wall section and a plurality of second wall sections. A respective wall section, in particular, is configured in a coherent manner. Respectively different wall sections, in particular, are configured separately. Preferably, the inner wall configures a plurality of first wall sections and a plurality of second wall sections.

The at least one first wall section, in particular, in configured in a wear-protected manner. For example, the at least one first wall section is hardened and/or made of a hard material. The at least one second wall section, in particular, is configured in a non-wear-protected manner and, in particular, not treated in order to increase its material hardness. The at least one second wall section, for example, is configured by the basic material or the basic raw material of the housing component. The basic raw material is known and common. As basic raw material, for example, the raw material 1.4112 can be used.

The at least one first wall section and the at least one second wall section configure an inner surface of the inner wall. The at least one first wall section and/or the at least one second wall section can be configured due to the treatment of a basic material of the base body and/or due to an application of a material layer onto a basic material of the base body. A treatment, in particular, comprises a hardening, such as for example surface hardening, diffusion hardening (nitriding, nitrocarburizing), electron beam hardening, laser hardening and/or inductive hardening. The hardening takes place, in particular, by thermal processes. The at least one first wall section and/or the at least one second wall section can be configured on at least one basic layer of the base body. The at least one basic layer can be softer than the at least one first wall section and—if applicable—can also be softer than the at least one second wall section. Further on, the at least one basic layer can be harder than the at least one second wall section and—if applicable—can also be harder than the at least one first wall section.

The hardness of the wall sections is determined, for example, according to Brinell (HB) subject to DIN EN ISO 6506-1 or according to Vickers (HV) subject to DIN EN ISO 6507-1 or according to Rockwell (HRC) subject to DIN EN ISO 6508.

The housing component can be configured as a housing section. Further on, the housing component can be configured as a bushing, which is inserted into a housing base body, with the result that a housing section is configured.

A housing component wherein the inner wall configures a plurality of first wall sections and a plurality of second wall sections, which are arranged alternatingly to one another, ensures a reliable wear protection and a positive influence on the material processing. Due to the alternating arrangement of first wall sections and second wall sections, from a qualitative point of view, wall section sequences in the hardness degree hard/soft/hard, in particular hart/soft/hard/soft/hard or soft/hard/soft, in particular soft/hard/soft/hard/soft can be created. The hardness degree between respectively adjacent wall sections thus alternatingly decreases and increases or increases and decreases. The comparably softer second wall sections absorb tensions of the harder first wall sections and avoid crack growth and spalling. In addition, the second wall sections allow for a profile of the inner wall in a flexible manner.

Preferably, the at least one second wall section has a smaller surface than the at least one first wall section. The proportion of the at least one second wall section in the inner surface thus is lower than the proportion of the at least one first wall section. The first wall sections, to some degree, protect the intermediate, softer second wall section. After a certain material removal of the second wall sections, in addition, a material to be processed in the multi-shaft screw machine can accumulate, which provides for a wear protection and/or a lubricating function, depending on the material. Such a material, for example, comprises ceramic particles or metallic particles. Additionally, after a material removal, a plastic molten film can develop, forming a kind of lubricating film and avoiding further wear of the second wall sections and/or providing for a lubricating function. Thus, due to the removed material, a lubricant reservoir is configured. A profile of the inner wall, for example, leads to an increase in shear forces in the fusing region.

A housing component, wherein the at least one first wall section and/or the at least one second wall section is arranged in at least one triangle region of the inner wall (W), ensures a reliable wear protection and a positive influence on the material processing. By respectively two bores interpenetrating each other, triangle regions opposing each other are configured. In the triangle regions, material stress and thus wear and tear is high. Due to the arrangement of the wall sections in at least one of the triangle regions, the wear protection is optimized and, in particular, a positive influence on the material processing is provided for. The triangle regions are arranged centrally between central longitudinal axes of the bores interpenetrating each other. The triangle regions, in particular, have a dimension transverse or perpendicular to the conveying direction, which by definition corresponds to 20%, in particular to 30%, in particular to 40%, in particular to 60%, in particular to 80%, and in particular to 100% of the axis-center distance of the central longitudinal axes of the adjacent bores.

A housing component, wherein the at least one first wall section and/or the at least one second wall section is arranged in at least one side region of the inner wall, ensures a reliable wear protection and a positive influence on the material processing. The central longitudinal axes of respectively two bores interpenetrating each other define a respective central longitudinal plane. The side regions are arranged centrally to the respective central longitudinal plane. The side regions are arranged opposite to a penetration opening of the bores interpenetrating each other. The side regions have a dimension perpendicular to the respective central longitudinal plane, which by definition corresponds to 30%, in particular to 40%, and in particular to 50% of a diameter of the bores. In particular in the fusing region or plasticizing region, the treatment element shafts tend to inclination, which brings them into contact with the inner wall of the respective housing component in the side regions. The treatment element shafts thus run towards the housing component. Due to the metal-metal contact of the treatment element shafts and the housing component, the housing component is stressed to a large extent, which leads to an adhesive wear. Due to the configuration of the inner wall in the side regions, a wear protection is ensured.

A housing component, wherein the at least one first wall section and/or the at least one second wall section is configured in a strip-shaped manner, ensures a reliable wear protection and a positive influence on the material processing. Strip-shaped in particular means that for a longitudinal extension x in relation to a transverse extension y, it is provided that: $x/y \geq 2$, in particular $x/y \geq 4$, and in particular $x/y \geq 10$. Preferably, the at least one wall section extends in the conveying direction and/or extends perpendicularly to the conveying direction. The at least one wall section, for example, extends exclusively in conveying direction or exclusively perpendicularly to the conveying direction or spirally in the conveying direction or transversely to the conveying direction. The first wall sections and/or the second wall sections, in particular, are arranged in rows, which run in the conveying direction, transversely to the conveying direction or perpendicularly to the conveying direction. Further on, the first wall sections and/or the second wall sections, for example, are arranged spirally with identical and/or different offset angles.

A housing component, wherein the at least one first wall section and/or the at least one second wall section runs in the direction of the conveying direction, ensures a reliable wear protection and a positive influence on the material processing. Preferably, the respective at least one wall section, with a main extension direction, exclusively runs in the conveying direction. The respective at least one wall section, preferably, extends over the entire length of the at least two bores. Preferably, the respective at least one wall section is configured in a strip-shaped manner, with the result that a dimension x in longitudinal direction corresponds to a length of the at least two bores.

A housing component, wherein the at least one first wall section and/or the at least one second wall section runs around at least one central longitudinal axis of the at least two bores, ensures a reliable wear protection and a positive influence on the material processing. The at least one wall section, with a main extension direction, at least section-wise, runs around at least one of the central longitudinal axes. The at least one wall section, for example, runs spirally in the conveying direction or against the conveying direction. The spiral course, for example, extends along one of the bores and is interrupted by a penetration opening of the at least two bores. The spiral course or the grade of the spiral course, for example, is adapted to the grade of the treatment element shafts or the screw elements of the treatment element shafts. A negative grade of the spiral course, with regard to the grade of the screw elements, increases the shear rates, whereas a positive grade decreases the shear rates. Due to reduced shear rates, the material stress of the material to be processed is reduced, as well. Further on, the spiral course, for example, extends along all bores, with the result that the spiral course is not interrupted. Moreover, the respective at least one wall section, for example, exclusively runs perpendicularly to the conveying direction.

A housing component, wherein the at least one first wall section and/or the at least one second wall section is configured as a material layer applied onto the base body, ensures a reliable wear protection and a positive influence on the material processing. The application of the material layer, in particular, takes place by at least one of the following application types: laser welding, PTA welding (PTA: Plasma Transferred Arc), electrode welding, thermal injection, hot isotactic pressing, sintering, soldering, additive production, Chemical Vapor Deposition coating and/or Physical Vapor Deposition coating, case hardening, coating by detonation, nitriding, boriding. For a radial layer thickness D of the material layer, preferably, it is provided that: 0.1 mm≤D≤30 mm, in particular 1.0 mm≤D≤25 mm, in particular 2.0 mm≤D≤20 mm, in particular 4.0 mm≤D≤15 mm, in particular 6.0 mm≤D≤10 mm.

For the configuration of the at least one first wall section, a material layer is applied, comprising at least one material chosen from the following materials:

Cobalt base alloys (stellites), NiCrBSi base alloys, powder metallurgical tool steels with or without hard material portion and with iron basis, composite materials of at least one of the aforementioned raw materials with additional carbide and/or nitride hard material intercalations, CrN, TiAlN, TiC.

For the configuration of the at least one second wall section, a material layer is applied, comprising at least one material chosen from the following materials:

High-grade steels, low-alloy steels, nickel-based raw materials, NiCr70Nb, aluminum, brass, bronzes, such as for example Al bronzes, Cu bronzes or Ni bronzes, Waukesha alloys.

The respective material layer, in particular, is applied onto at least one basic layer, which is configured on the base body. The at least one basic layer, in particular, is harder than the at least one second wall section. The at least one basic layer, for example, is softer or harder than the at least one first wall section. Further on, the respective material layer, for example, is applied onto at least one basic layer, which is softer than the at least one first wall section. The at least one basic layer, for example, is harder or softer than the at least one second wall section. The respective hardness degree of the at least one basic layer can be chosen randomly, according to the requirements, in relation to the hardness degree of the at least one first wall section and/or the at least one second wall section.

Another object of the invention is to create a multi-shaft screw machine, which ensures a simple and reliable wear protection. The multi-shaft screw machine, in particular by the configuration of the housing, shall have a positive influence on the material processing.

This object is achieved by a multi-shaft screw machine comprising a housing, which comprises at least one housing component, at least two housing bores configured in the housing and interpenetrating each other, and at least two treatment element shafts arranged in a pivotable manner in the housing bores. The advantages of the multi-shaft screw machine according to the invention correspond to the advantages already described with regard to the housing component according to the invention. Preferably, the multi-shaft screw machine is configured as a two-shaft screw machine, which comprises two interpenetrating housing bores and two treatment element shafts arranged in the housing bores. The multi-shaft screw machine, preferably, is pivotable or pivoted in the same direction. The at least two treatment element shafts are thus pivotable or pivoted in the same directions of rotation. The at least two treatment element shafts, in particular, are configured closely intermeshing. The at least two treatment element shafts, preferably, strip off the housing inner wall of housing, in particular entirely. The housing component, for example, is configured as a housing section and/or as a bushing for the connection with a housing base body in order to configure a housing section.

A multi-shaft screw machine, wherein the housing comprises at least two housing components, which are configured identically, ensures a reliable wear protection and a positive influence on the material processing. The at least two identical housing components, in particular, are arranged one directly after the other in the conveying direction. Due to this, the configuration of a functional area is possible, whose length in the conveying direction is larger than the length of a housing component in the conveying direction. For example, the configuration of a plasticizing area or fusing area is possible, which extends over a plurality of housing components. The housing components, in particular, allow for an improved material processing and/or a relief or a lower wear and tear in the plasticizing area or fusing area and the homogenization area. Due to this, the process component can be configured in a comparatively shorter manner, since the material can be fused quicker and homogenized or processed better.

A multi-shaft screw machine, wherein the housing comprises at least two housing components, which are configured differently, ensures a reliable wear protection and a positive influence on the material processing. The different housing components allow for the configuration of different functional areas. In the respective functional area, the respective corresponding housing component supports the designated function. The designated function, for example, is predefined by the configuration of the treatment element shafts. The multi-shaft screw machine, for example, has at least two of the following functional areas: feed area, fusion area or plasticizing area, degassing area, homogenization area, mixing area, pressurization area. In the respective functional area, the at least one housing component is configured such that the designated function is supported and/or a desired wear protection is achieved. In particular, due to a profile of the inner wall and a volume expansion resulting therefrom, the material processing is positively influenced.

Yet another object of the invention is to create a method for the production of a housing component for a multi-shaft screw machine, which ensures a simple and reliable wear protection. Due to the production of the housing component, in particular, the material processing in the multi-shaft screw machine shall be positively influenced.

This object is achieved by a method for the production of a housing component, including the steps: providing a base body, in which at least two bores interpenetrating each other are configured, wherein the bores extend in a conveying direction through the base body, and the bores are limited transversely to the conveying direction by an inner wall of the base body, and configuring at least one first wall section and at least one second wall section of the inner wall such that the at least one first wall section is harder than the at least one second wall section. The advantages of the method according to the invention correspond to the advantages already described with regard to the housing component according to the invention or the multi-shaft screw machine produced therewith. The method according to the invention may in particular also be extended with the features of the inventive housing component. Preferably, the method according to the invention is part of a method for the production of a multi-shaft screw machine. The method for the production of the multi-shaft screw machine, in particular, comprises the production of a housing, which comprises at least one housing component according to the invention. The method for the production of the multi-shaft screw machine may in particular also be extended with the features of the inventive multi-shaft screw machine.

Further features, advantages and details of the invention arise from the following description of several exemplary embodiments.

DESCRIPTION OF THE PREFERRED EMBODIMENTS

Figure 1:
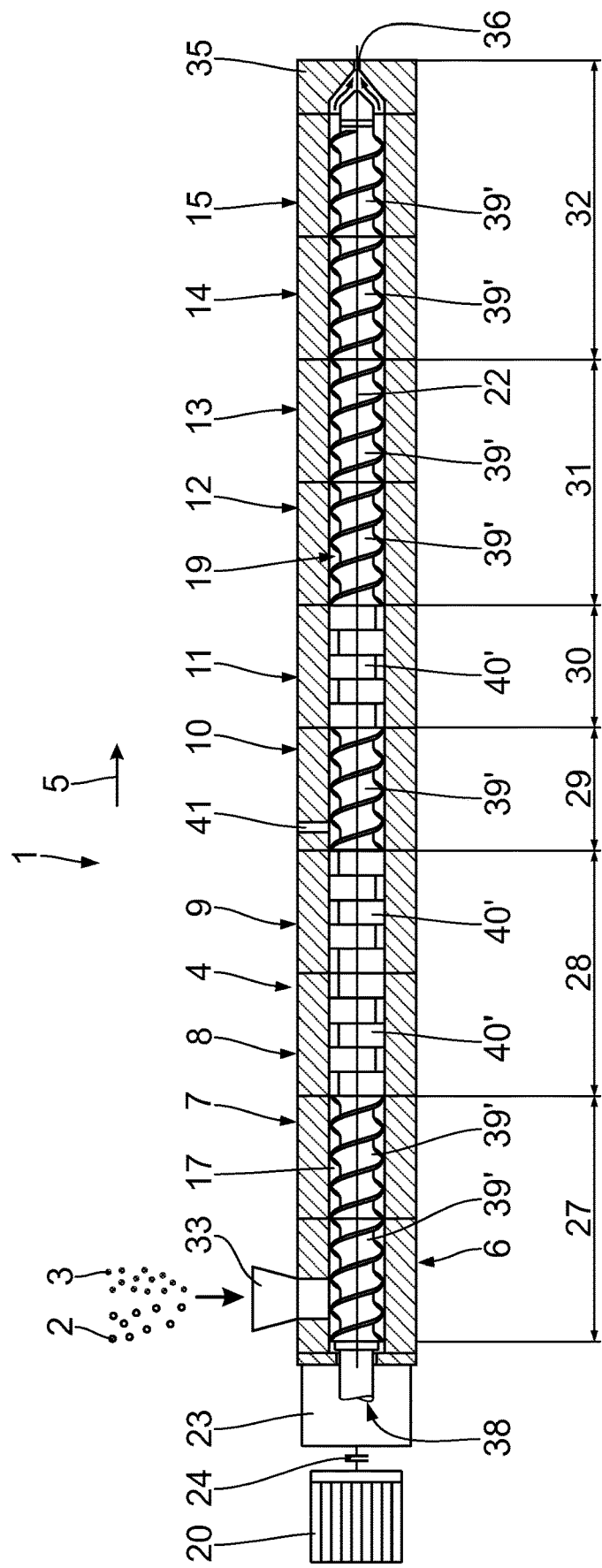
FIG. 1 shows a partially sectioned view of a multi-shaft screw machine with a housing assembled of a plurality of housing components.
Figure 2:
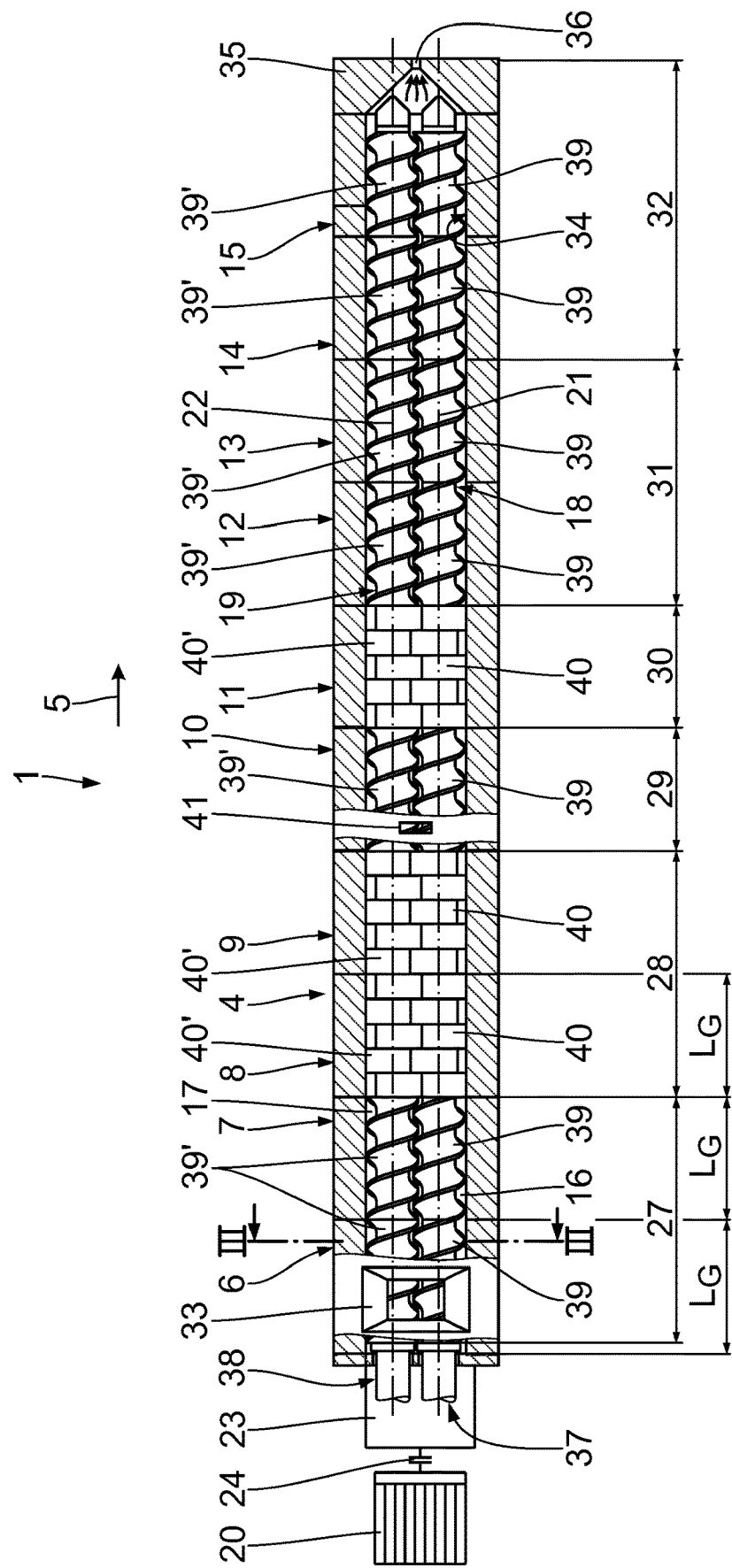
FIG. 2 shows a partially sectioned top view onto the multi-shaft screw machine in FIG. 1.
Figure 3:
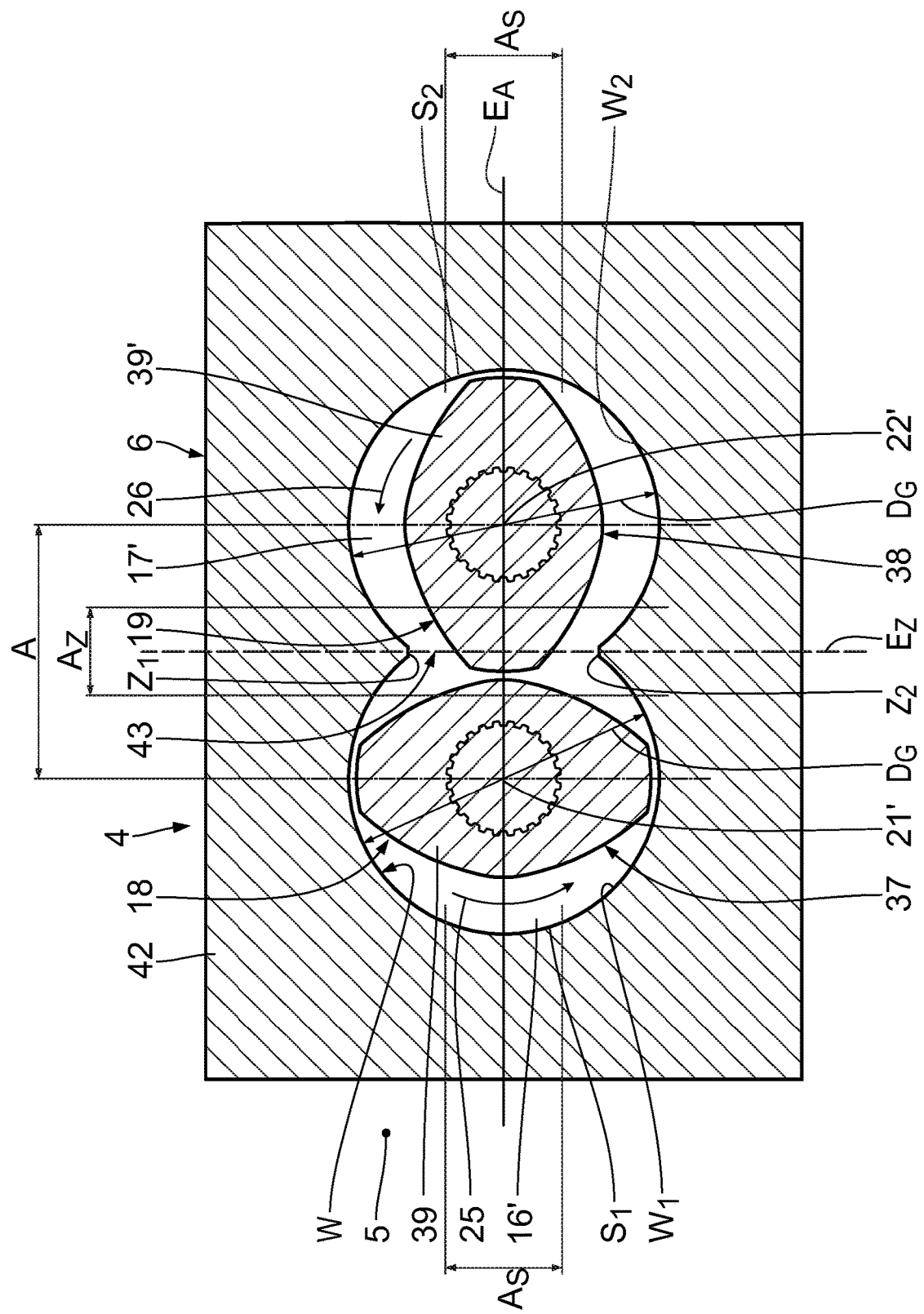
FIG. 3 shows a cross section through the multi-shaft screw machine along the intersection line III-III in FIG. 2.

A multi-shaft screw machine 1, for example, serves for processing a plastic material 2, which is provided with additives 3. The multi-shaft screw machine 1 is configured as a two-shaft screw machine.

The screw machine 1 has a housing 4 of a plurality of housing components 6 to 15, arranged one after the other in a conveying direction 5. The housing components 6 to 15 are configured as housing sections. The housing components 6 to 15 are connected to each other in a common manner via flanges, not depicted in further detail, and form the housing 4.

In the housing 4, two housing bores 16, 17 are configured, being parallel to and interpenetrating one another, whose cross section shows the shape of a horizontal figure eight. The housing bores 16, 17 are limited by a housing inner wall 34. In the housing bores 16, 17, two treatment element shafts 18, 19 are arranged in a concentric manner, which are pivotable by a drive motor 20 around corresponding rotation axes 21, 22. Between the treatment element shafts 18, 19 and the drive motor 20, a branch gear 23 is arranged, wherein again between the drive motor 20 and the branch gear 23, a coupling 24 is arranged. The treatment element shafts 18, 19 are driven in the same direction, i.e. in the same directions of rotation 25, 26 around the rotation axes 21, 22.

On the first housing component 6 adjacent to the branch gear 23, a material infeed 33 in the shape of a hopper is arranged, through which the plastic material 2 to be processed and, if applicable, the additives 3 can be fed into the housing bores 16, 17.

The screw machine 1, in the conveying direction 5, consecutively shows a feed area 27, a fusion area or plasticizing area 28, a degassing area 29, a homogenization area 30, a conveying and mixing area 31 and a pressurization area 32. The housing 4, on the last housing component 15, is closed by an orifice plate 35, which has a discharge opening 36.

The treatment element shafts 18, 19 are configured by shafts 37, 38 and treatment elements 39, 40 or 39', 40' arranged thereon. The treatment elements 39, 40 arranged on the first shaft 37 and the treatment elements 39', 40' arranged on the second shaft 38 correspond to each other, wherein the reference numbers of the treatment elements 39', 40' arranged on the second shaft 38 have a ' for the sake of distinction. The treatment elements 39, 39' are configured as screw elements, whereas the treatment elements 40, 40' are configured as kneading elements. The kneading elements 40, 40' have kneading disks, arranged at an angular offset after one another and in the direction of the respective rotation axis 25, 26. A plurality of kneading disks arranged after one another, for example, are configured as a one-piece kneading block.

In the feed area 27, screw elements 39, 39' are arranged adjacent to one another on the shafts 37, 38, gearing into each other and being configured in pairs closely intermeshing. In the fusion area 28, kneading elements 40, 40' are arranged on the shafts 37, 38, also being configured in pairs closely intermeshing. In the subsequent degassing area 29, again, closely intermeshing screw elements 39, 39' are arranged on the shafts 37, 38. The corresponding housing component 10 has a degassing opening 41 for degassing. In the subsequent homogenization area 30, closely intermeshing kneading elements 40, 40' are arranged on the shafts. Further on, in the subsequent conveying and mixing area 31, closely intermeshing screw elements 39, 39' are arranged on the shafts 37, 38. Correspondingly, in the subsequent pressurization area 32, screw elements 39, 39' are arranged on the shafts 37, 38. The screw elements 39, 39' and the kneading elements 40, 40', for example, are configured in a double-threaded and/or in a triple-threaded manner.

The housing components 6 to 15 each have a base body 42, in which the housing bores 16, 17 are configured in sections. Each one of the housing components 6 to 15 thus has bores, which configure a section of the housing bores 16, 17. The bores of the respective housing component 6 to 15 obtain the reference numbers 16', 17' in the following, in order to distinguish them from the housing bores 16, 17. Due to the aligned arrangement of the housing components 6 to 15, the bores 16', 17' result in the described housing bores 16, 17. The bores 16', 17' each have a central longitudinal axis, which is indicated as 21', 22' in the following and which correspond to the central longitudinal axes of the housing bores 16, 17 or the rotation axes 21, 22. The bores 16', 17' of the respective housing component 6 to 15 are limited by an inner wall W, which configures a part of the housing inner wall 34. A first section $W_1$ of the inner wall W limits the first bore 16', whereas a second section $W_2$ of the inner wall W limits the second bore 17' of the respective housing component 6 to 15.

In the conveying direction 5, the base body 42 has a length $L_G$. The bores 16', 17' extend in the conveying direction 5 through the entire base body 42, with the result that the bores 16', 17' have the length $L_G$, as well. The bores 16', 17' each have a diameter $D_G$. The bores 16', 17' have an axis-center distance A of the central longitudinal axes 21', 22', with the result that the bores 16', 17' interpenetrate each other. The bores 16', 17' or housing bores 16, 17, interpenetrating each other, configure a penetration plane $E_Z$ and so called triangle regions $Z_1$ and $Z_2$. In the penetration plane $E_Z$, a penetration opening 43 is configured. The triangle regions $Z_1$, $Z_2$ are arranged in relation to an axial plane $E_A$ through the central longitudinal axes 21', 22', opposite to one another. The triangle regions $Z_1$, $Z_2$ extend in the conveying direction 5 along the entire length $L_G$ of the respective housing component 6 to 15. Perpendicular to the penetration plane $E_Z$ or parallel to the axial plane $E_A$, the triangle regions $Z_1$, $Z_2$ have a dimension $A_Z$. For the dimension $A_Z$, it is provided by definition that: $A_Z=0.2$ A, in particular 0.3, in particular 0.4 A, in particular 0.6 A, in particular 0.8 A, and in particular 1.0 A. The triangle regions $Z_1$, $Z_2$ are configured symmetrically to the penetration plane $E_Z$. The dimension $A_Z$ thus is located with one half, respectively, on both sides of the penetration plane $E_Z$.

The inner wall W of the housing components 6 to 15 further on has side regions $S_1$ and $S_2$. The side regions $S_1$ and $S_2$ are arranged opposite to the penetration plane $E_Z$ and symmetrically to the axial plane $E_A$. The side regions $S_1$ and $S_2$ extend along the entire length $L_G$ of the respective housing component 6 to 15. The side regions $S_1$ and $S_2$ have a dimension $A_S$, perpendicular to the axial plane $E_A$ or parallel to the penetration plane $E_Z$. For the dimension $A_S$, it is provided by definition that: $A_S=0.3$ $D_G$, in particular 0.4 $D_G$, and in particular 0.5 $D_G$. The side regions $S_1$ and $S_2$ are arranged symmetrically to the axial plane $E_A$. Consequently, the dimension $A_S$ is located with one half on both sides of the axial plane $E_A$.

Figure 4:
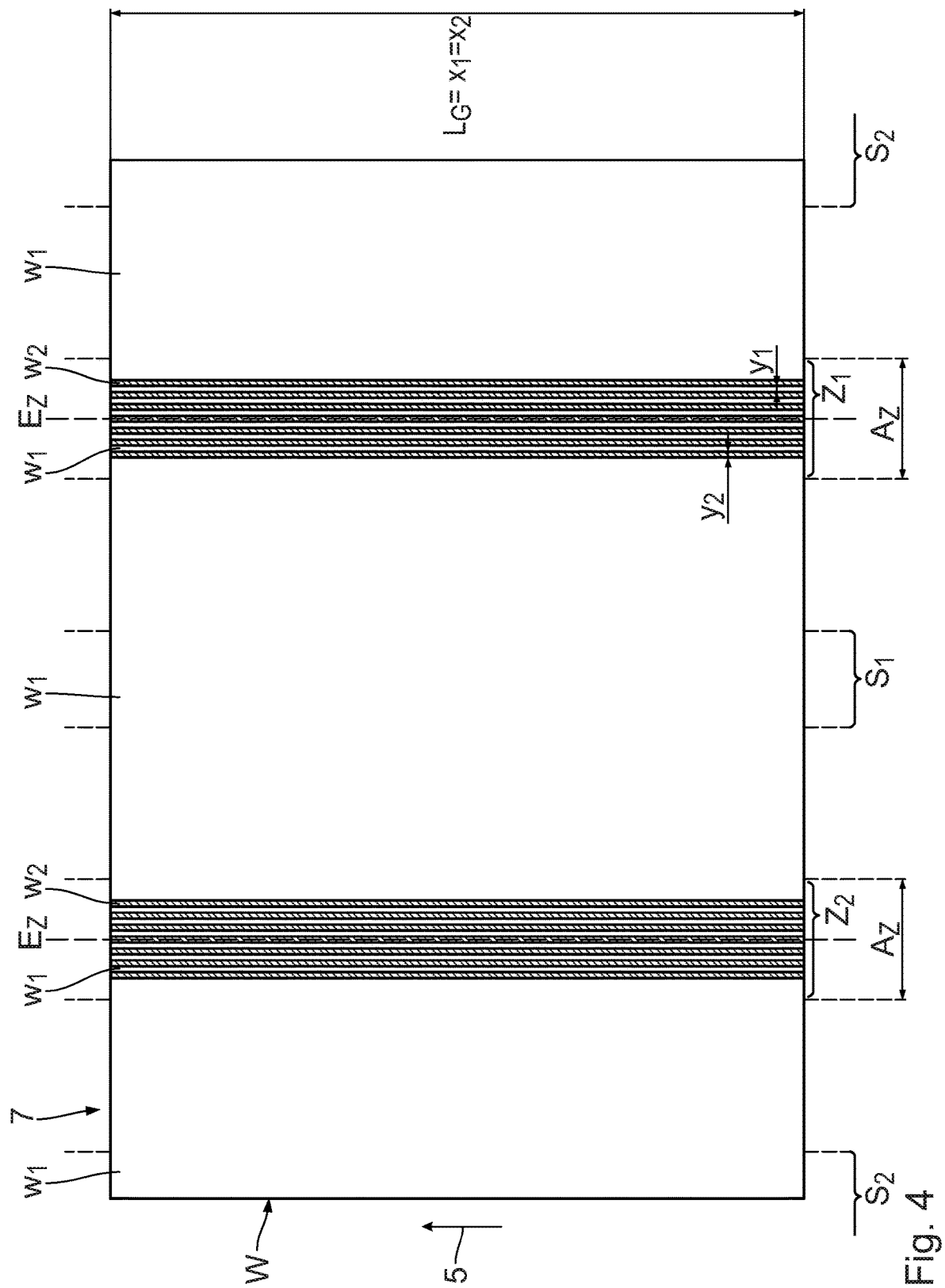
FIG. 4 shows a view of an inner wall of one of the housing components, according to a first embodiment, in a plane.

FIG. 4 visualizes the inner wall W of the housing component 7 in a plane. In the triangle regions $Z_1$, $Z_2$, first wall sections $w_1$ and second wall sections $w_2$ are configured alternatingly, wherein the first wall sections $w_1$ are harder in comparison to the second wall sections $w_2$. The first wall sections $w_1$ are configured in a strip-shaped manner and, with their main extension direction, extend in a parallel manner to the conveying direction 5. The first wall sections $w_1$ have a length $x_1$ in the conveying direction 5 and perpendicular to the conveying direction 5 have a width $y_1$. For the ratio $x_1/y_1$, it is provided that: $x_1/y_1 \geq 2$, in particular: $x_1/y_1 \geq 4$, and in particular: $x_1/y_1 \geq 10$. The length $x_1$ corresponds to the length $L_G$.

Accordingly, the second wall sections $w_2$ are configured in a strip-shaped manner and extend in a parallel manner to the conveying direction 5. The second wall sections $w_2$ have a length $x_2$ in the conveying direction 5 and perpendicular to the conveying direction 5 have a width $y_2$. For the ratio $x_2/y_2$, it is provided that: $x_2/y_2 \geq 2$, in particular: $x_2/y_2 \geq 4$, and in particular: $x_2/y_2 \geq 10$. The length $x_2$ corresponds to the length $L_G$. The first wall sections $w_1$ and/or the second wall sections $w_2$ can be configured in an identical and/or different manner.

Figure 5:
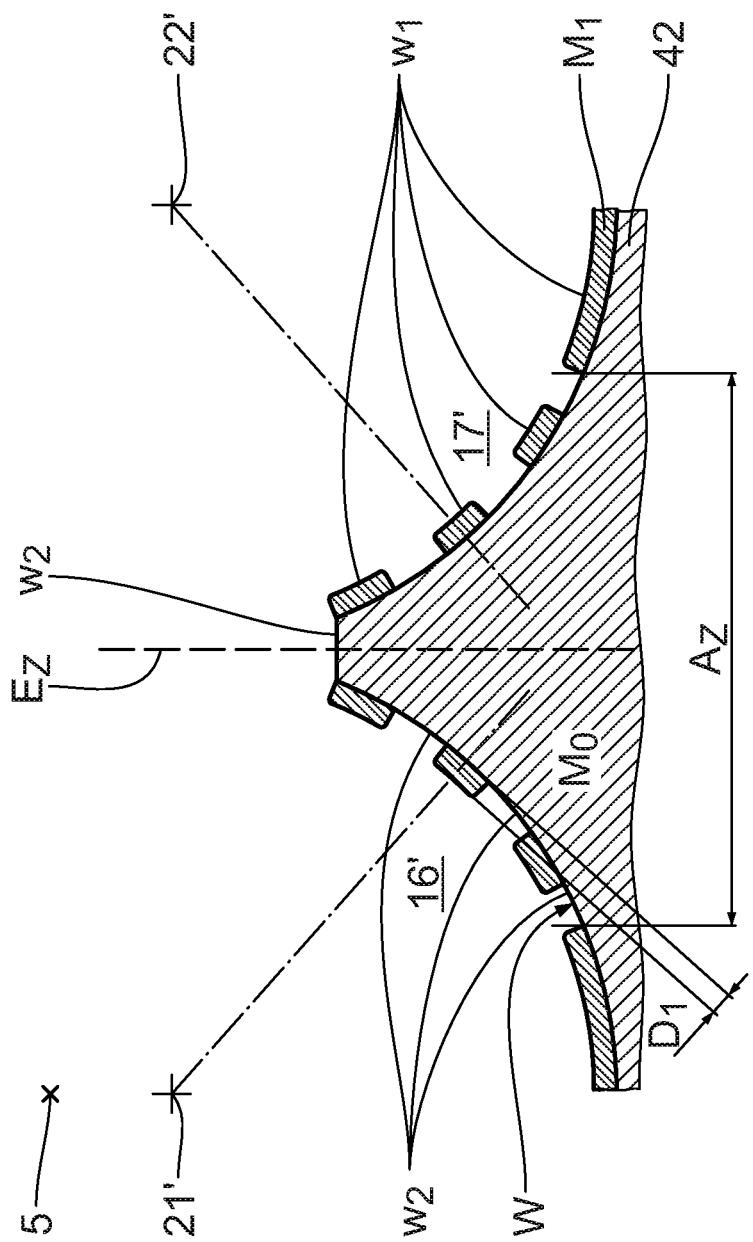
FIG. 5 shows a cross section of the housing component in FIG. 5 in a triangle region.

The first wall sections $w_1$ are configured by application of a material layer $M_1$ onto the base body 42. This is visualized in FIG. 5. The material layer $M_1$, in radial direction to the respective central longitudinal axis 21', 22', has a layer thickness $D_1$, for which it is provided that, for example: 1 mm $\leq D_1 \leq$ 4 mm.

The application of the material layer $M_1$, for example, takes place by at least one of the following application methods: laser welding, PTA welding (PTA: PlasmaTransferredArc), electrode welding, thermal injection, hot isotactic pressing, sintering, soldering, additive production, Chemical Vapor Deposition coating and/or Physical Vapor Deposition coating, case hardening, coating by detonation, nitriding, boriding.

For the configuration of the first wall sections $w_1$, at least one material is chosen from the following materials:

Cobalt base alloys (stellites), NiCrBSi base alloys, powder metallurgical tool steels with or without hard material portion and with iron basis, composite materials of at least one of the aforementioned raw materials with additional carbide and/or nitride hard material intercalations, CrN, TiAlN, TiC.

The second wall sections $w_2$ are configured by a basic material $M_0$ of the base body 42. The basic material $M_0$ is a common basic raw material, such as for example the raw material 1.4112.

Figure 6:
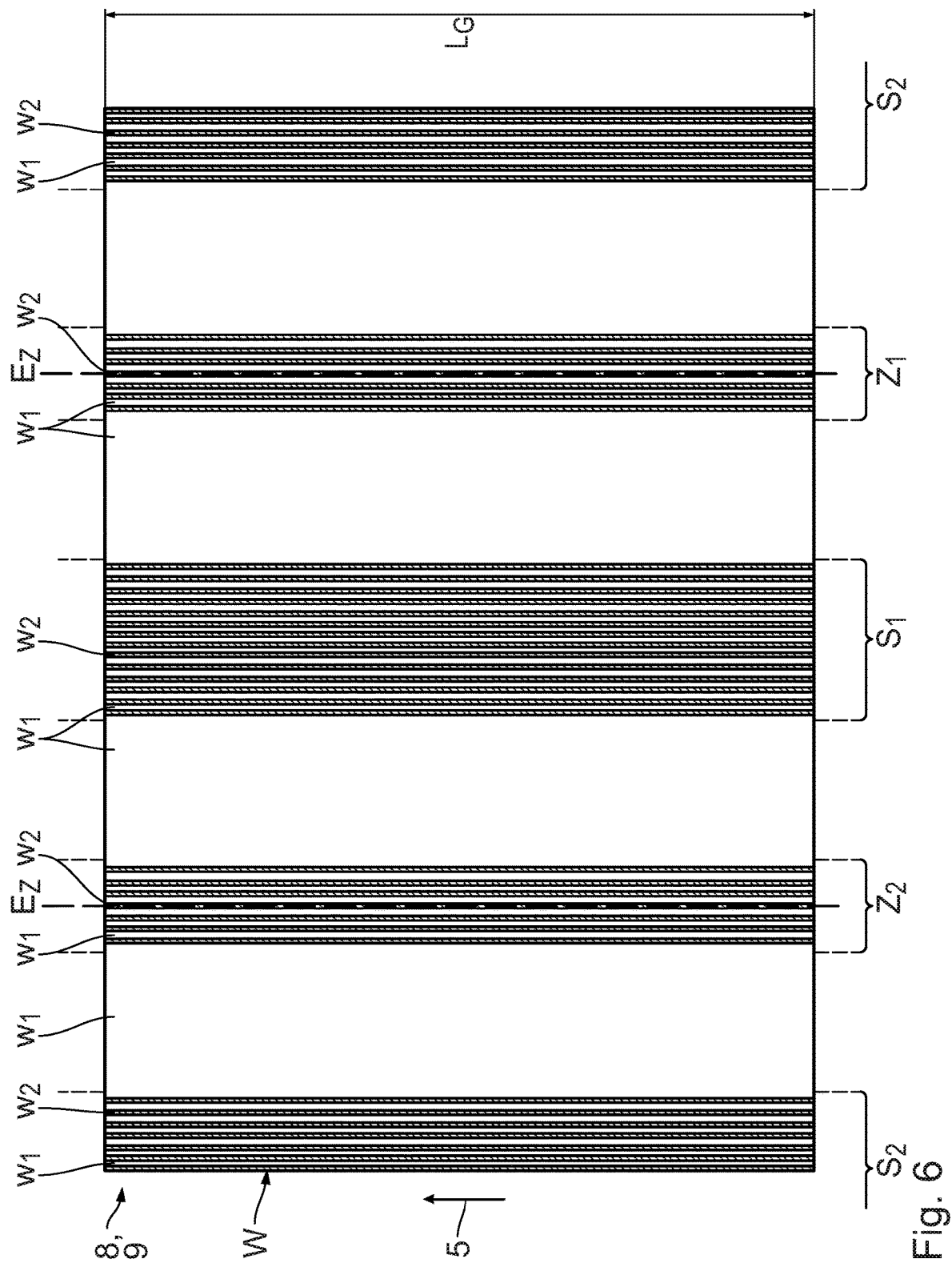
FIG. 6 shows a view of an inner wall of one of the housing components, according to a second embodiment, in a plane.

FIG. 6 visualizes the inner wall W of the housing component 8 or 9. The housing components 8, 9 are configured identically. In contrast to the housing component 7, the inner wall W of the housing component 8 or 9, in addition to the wall sections $w_1$ and $w_2$ in the triangle regions $Z_1$, $Z_2$, also has first wall sections $w_1$ and second wall sections $w_2$ in the side regions $S_1$ and $S_2$. The first wall sections $w_1$ and the second wall sections $w_2$ are configured corresponding to the wall sections $w_1$ and $w_2$ in the triangle regions $Z_1$, $Z_2$. The wall sections $w_1$, $w_2$ in the side regions $S_1$, $S_2$ differ in comparison to the wall sections $w_1$, $w_2$ in the triangle regions $Z_1$, $Z_2$ merely in terms of number. With regard to the further configuration, reference is made to the preceding embodiment.

Figure 7:
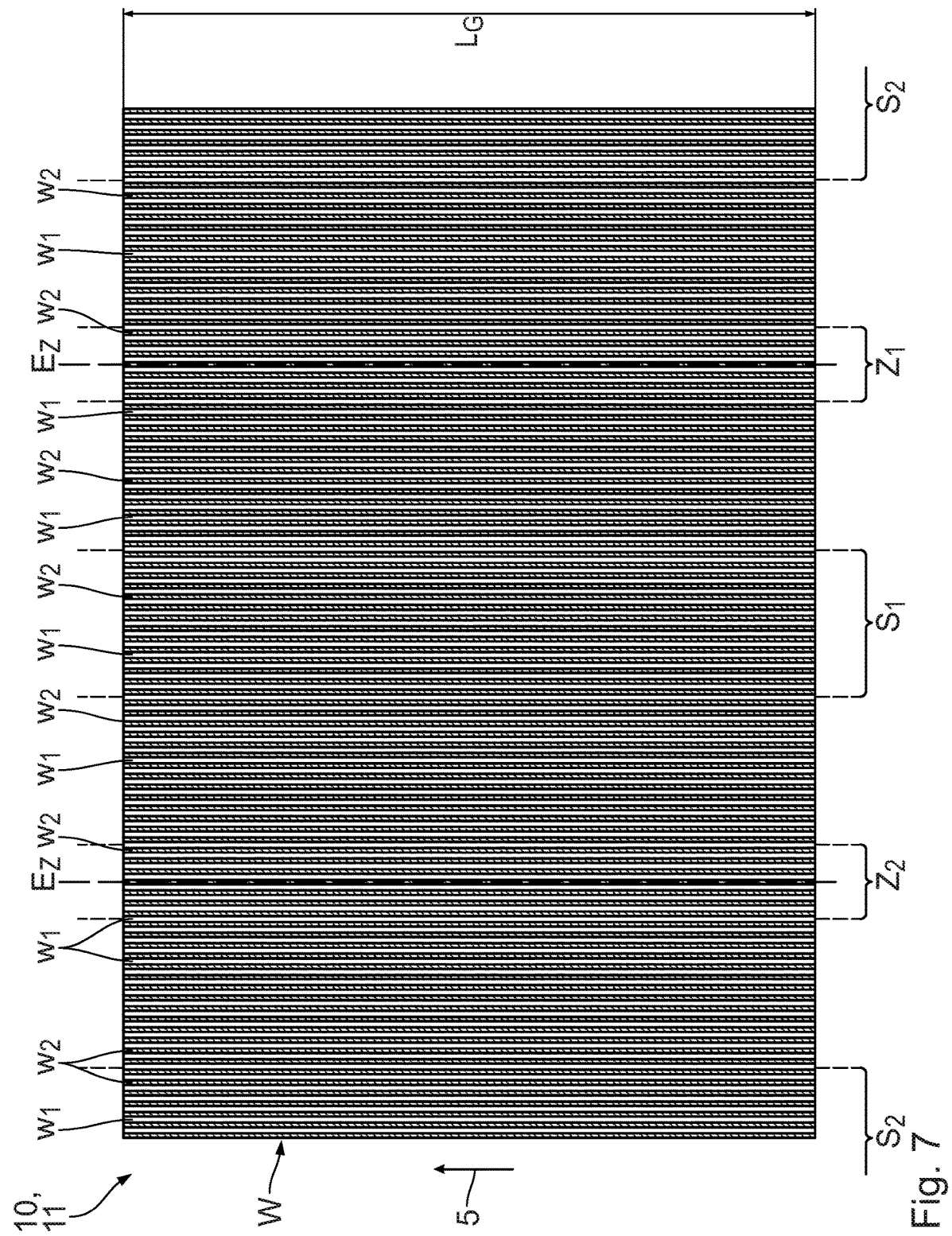
FIG. 7 shows a view of an inner wall of one of the housing components, according to a third embodiment, in a plane.

FIG. 7 visualizes the inner wall W of the housing components 10, 11. The housing components 10, 11, accordingly, are configured identically, except for the degassing opening 41. In contrast to the housing components 7 to 9, the entire inner wall W has alternating first wall sections $w_1$ and second wall sections $w_2$. The wall sections $w_1$, $w_2$ are configured according to the preceding embodiments. With regard to the further configuration, reference is made to the preceding embodiments.

Figure 8:
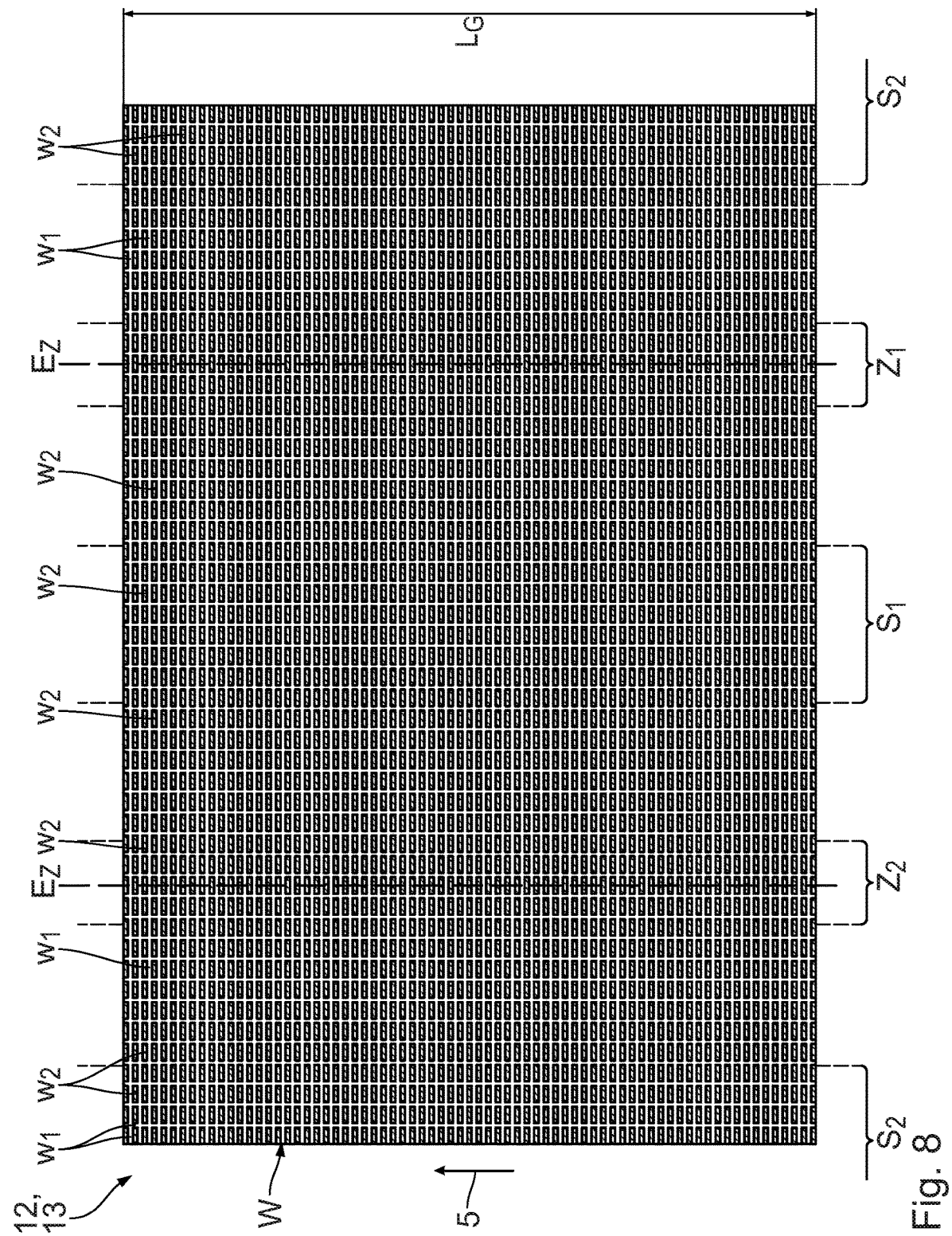
FIG. 8 shows a view of an inner wall of one of the housing components, according to a fourth embodiment, in a plane.

FIG. 8 visualizes the inner wall W of the housing components 12, 13. In contrast to the preceding embodiments, the second wall sections $w_2$, with their main extension direction, extend perpendicularly to the conveying direction 5. The second wall sections $w_2$ are arranged in rows oriented in a parallel manner and perpendicularly to the conveying direction 5. The second wall sections $w_2$ are distributed over the entire inner wall W. Due to the arrangement of the second wall sections $w_2$, first wall sections $w_1$ configure, which run in a parallel manner to the conveying direction 5 and extend along the entire length $L_G$ of the housing components 12, 13. Further on, first wall sections $w_1$ configure, which run perpendicularly to the conveying direction 5 around the central longitudinal axes 21', 22', and which cross the first wall sections $w_1$ running in a parallel manner to the conveying direction 5. The first wall sections $w_1$ thus form a grid. With regard to the further configuration, reference is made to the preceding embodiments.

Figure 9:
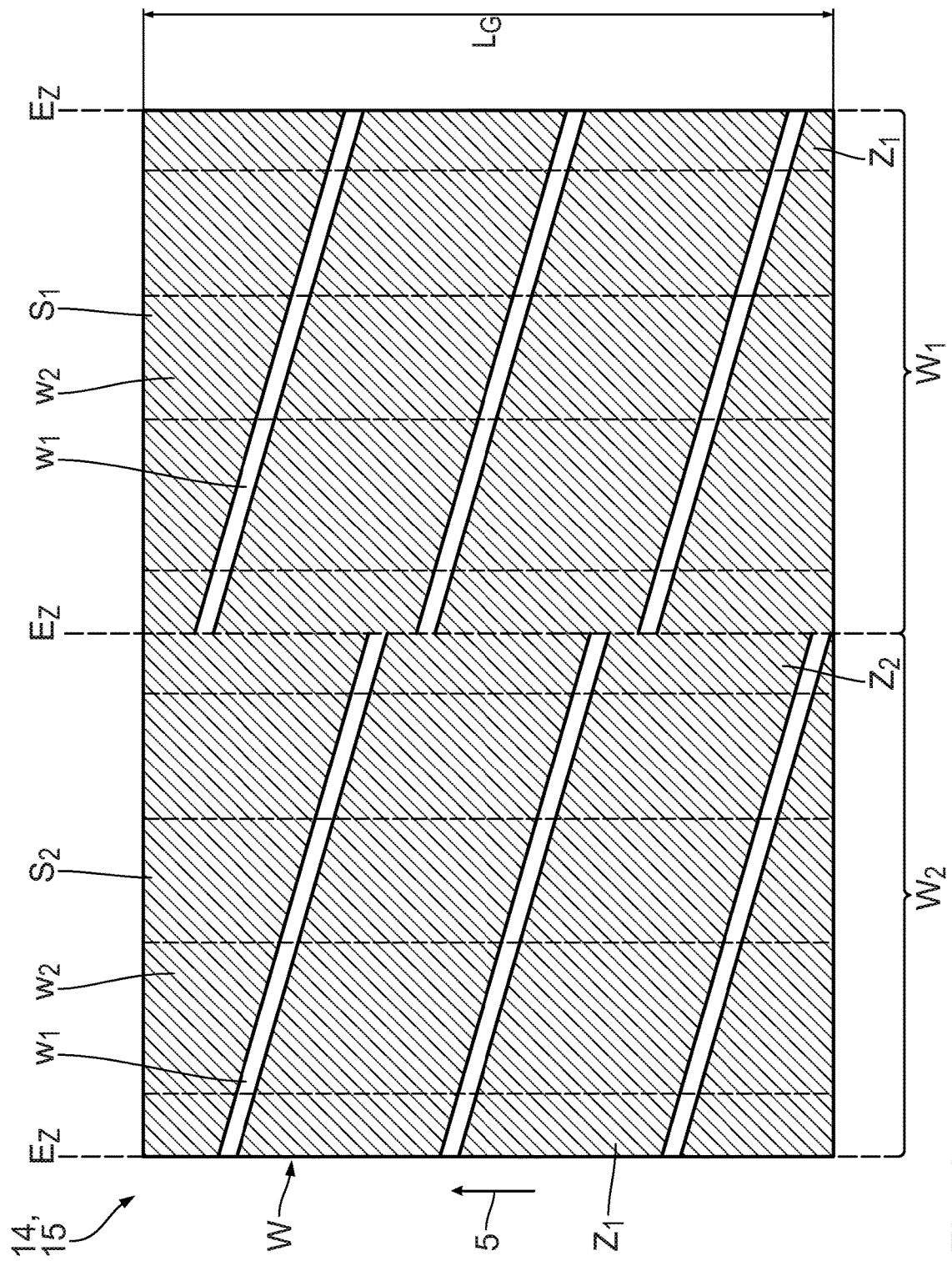
FIG. 9 shows a view on an inner wall of one of the housing components, according to a fifth embodiment, in a plane.

FIG. 9 visualizes the inner wall W of the housing components 14, 15. In contrast to the preceding embodiments, the first wall sections $w_1$ run with a positive grade in the conveying direction 5, at the first section $W_1$ of the inner wall W around the central longitudinal axis 21' and at the second section $W_2$ of the inner wall W around the central longitudinal axis 22'. The second wall sections $w_2$ run accordingly between the corresponding first wall sections $w_1$. Alternatively or additionally, the wall sections $w_1$, $w_2$ may run with a negative grade in the conveying direction 5. The wall sections $w_1$ and $w_2$ thus run spirally with a positive grade and/or with a negative grade in relation to the directions of rotation 25, 26. The penetration opening 43 interrupts the spiral course. With regard to the further configuration, reference is made to the preceding embodiments.

Figure 10:
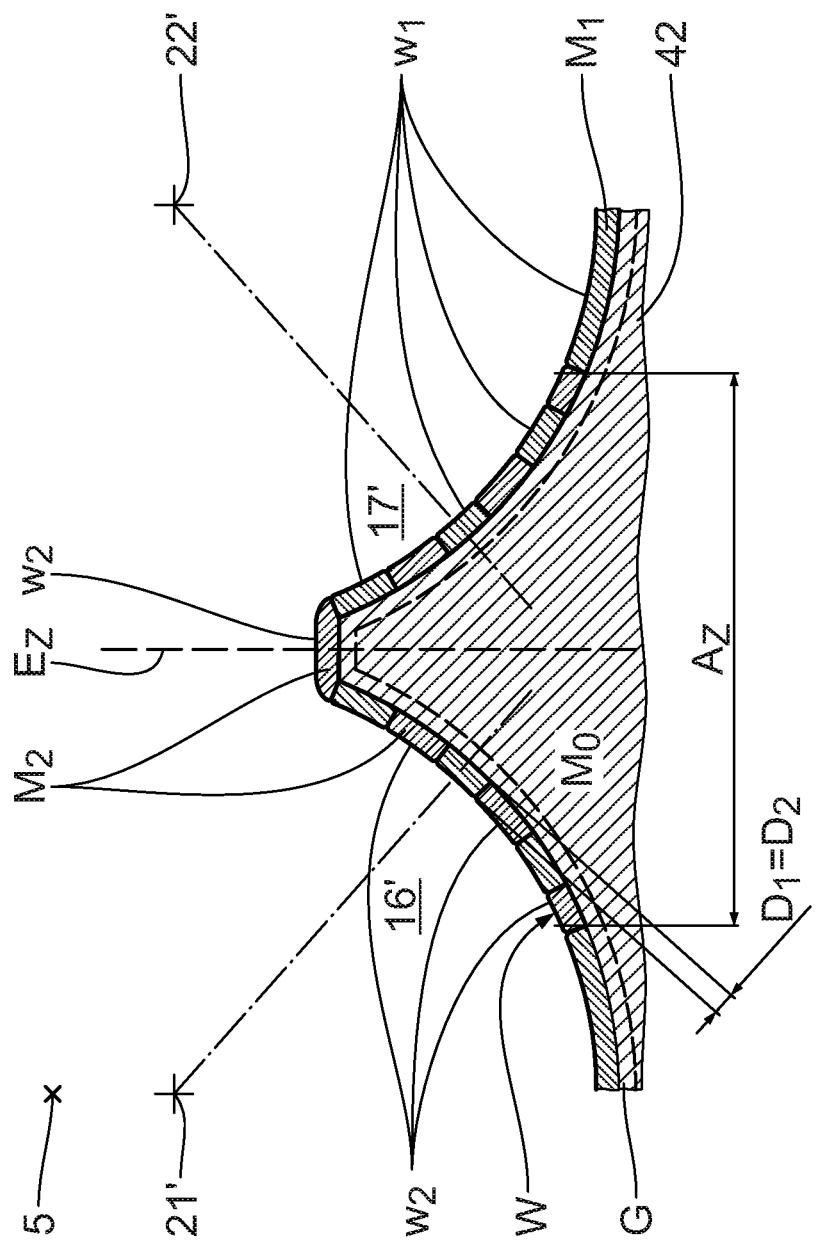
FIG. 10 shows a view of an inner wall of one of the housing components, according to a sixth embodiment, in a plane.

FIG. 10 shows another embodiment. In contrast to the preceding embodiments, the base body 42 on the inner wall W is treated, with the result that a basic layer G is configured. The basic layer G, for example, is configured by a thermal treatment and is hardened, in comparison to the basic material $M_0$. Subsequently, the first wall sections $w_1$ and the second wall sections $w_2$ are configured by material application of material layers $M_1$ and $M_2$.

The second wall sections $w_2$ have a layer thickness $D_2$ in the direction of the respective central longitudinal axis 21', 22', which, for example, corresponds to the layer thickness $D_1$. The configuration of at least one basic layer G and the configuration of the first wall sections $w_1$ by means of material application and/or of the second wall sections $w_2$ by means of material application can be combined randomly. The material layer $M_2$, in particular, comprises at least one material chosen from the materials:

High-grade steels, low-alloy steels, nickel-based raw materials, NiCr70Nb, aluminum, brass, bronzes, such as for example Al bronzes, Cu bronzes or Ni bronzes, Waukesha alloys.

With regard to the further configuration, reference is made to the preceding embodiments.

In further embodiments, the first wall sections $w_1$, alternatively or additionally, can be configured by a local surface hardening of the inner wall W. The local surface hardening, for example, takes place by electron-beam or laser hardening. The second wall sections $w_2$, for example, are configured by the basic material $M_0$ of the base body 42.

The housing components 7 to 15 can also be configured as bushings, which have at least one first wall section $w_1$ and at least one second wall section $w_2$ in the described manner. The bushings, for example, are connected with a housing base body, with the result that they form a respective housing section.

In general, the following is provided:

The configuration of the at least one first wall section $w_1$ and of the at least one second wall section $w_2$ can takes place by treatment of the inner wall W and/or by material application. The at least one first wall section $w_1$ and the at least one second wall section $w_2$, during the operation of the screw machine 1, have contact with the plastic material 2 to be processed. The layer thickness $D_1$ can be smaller, equal to or larger than the layer thickness $D_2$. Preferably, the layer thickness $D_2$ is larger than the layer thickness $D_1$. The material layers $M_1$, $M_2$ can be treated or processed after the application. A plurality of first wall sections $w_1$ can be configured identically and/or differently. A plurality of second wall sections $w_2$ can be configured identically and/or differently.

What is claimed is:

1. A housing component for the production of a housing of a multi-shaft screw machine comprising
    a base body,
    at least two boxes,
    which are configured in the base body and are interpenetrating each other,
    which extend in a conveying direction through the base body, and
    which are limited transversely to the conveying direction by an inner wall of the base body,
    wherein the inner wall configures at least one first wall section and at least one second wall section such that the at least one first wall section is harder than the at least one second wall section,
    wherein the inner wall is configured in a profiled manner in a sectional view, and
    wherein the at least two bores have continuously curved uninterrupted bore walls between opposing triangle regions of the inner wall with the at least one first wall section being configured as a separate material layer placed upon said continuously curved uninterrupted bore walls.

2. The housing component according to claim 1, wherein the inner wall configures a plurality of first wall sections and a plurality of second wall sections, which are arranged alternatingly to one another.

3. The housing component according to claim 1, wherein the at least one of the group comprising one first wall section and the at least one second wall section is arranged in the triangle regions of the inner wall.

4. The housing component according to claim 1, wherein the at least one of the group comprising one first wall section and the at least one second wall section is arranged in at least one side region of the inner wall.

5. The housing component according to claim 1, wherein the at least one of the group comprising one first wall section and the at least one second wall section is configured in a strip-shaped manner.

6. The housing component according to claim 1, wherein the at least one of the group comprising one first wall section and the at least one second wall section runs in the direction of the conveying direction.

7. The housing component according to claim 1, wherein the at least one of the group comprising one first wall section and the at least one second wall section runs around at least one central longitudinal axis of the at least two bores.

8. The housing component according to claim 1, wherein the at least one second wall section is configured as a material layer placed upon the continuously curved uninterrupted bore walls.

9. A multi-shaft screw machine comprising
    a housing, which comprises at least one housing component according to claim 1,
    at least two housing bores configured in the housing and interpenetrating each other, and
    at least two treatment element shafts arranged in a pivotable manner in the housing bores.

10. The multi-shaft screw machine according to claim 9, wherein the housing comprises at least two housing components, which are configured identically.

11. The Multi-shaft screw machine according to claim 9, wherein the housing comprises at least two housing components, which are configured differently.

12. The housing component according to claim 1, wherein:
    each of the at least two boreholes has a central longitudinal axis;
    the first wall section has an inner surface defining a portion of one of the at least two boreholes, the inner surface of the first wall section is arranged at a first radial distance from the central longitudinal axis of the one of the at least two boreholes;
    the second wall section has an inner surface defining a portion of the one of the at least two boreholes, the inner surface of the second wall section is arranged at a second radial distance from the central longitudinal axis of the one of the at least two boreholes;
    the first and second radial distances are different.

13. The housing component according to claim 12, wherein:
   the first radial distance is shorter than the second radial distance.

14. The housing component according to claim 1,
   wherein each of said interpenetrating bores have a central longitudinal axis;
   wherein said first wall sections have a radially outer surface in contact with said continuously curved uninterrupted bore walls, said radially outer surface being arranged at a first radial distance from the respective central longitudinal axis,
   wherein said second wall sections are arranged at a second radial distance from the respective central longitudinal axis, said first radial distance and said second radial distance being equal,
   wherein said first wall sections have a radially inner surface being arranged at a third radial distance from the respective central longitudinal axis, said third radial distance being less than said first and said second radial distances.

15. A method for the production of a housing component, including the steps:
   providing a base body, in which at least two bores interpenetrating each other are configured, wherein
      the bores extend in a conveying direction through the base body, and
      the bores are limited transversely to the conveying direction by an inner wall of the base body,
   configuring at least one first wall section and at least one second wall section of the inner wall such that the at least one first wall section is harder than the at least one second wall section, and
   configuring the inner wall in a profiled manner in a sectional view by applying at least one separate material layer onto continuously curved uninterrupted bore walls between opposing triangle regions of the inner wall of the at least two bores.

\* \* \* \* \*